United States Patent
Rhead et al.

(10) Patent No.: US 10,078,888 B2
(45) Date of Patent: Sep. 18, 2018

(54) THROUGH-FOCUS IMAGE COMBINATION

(71) Applicant: Fluke Corporation, Everett, WA (US)

(72) Inventors: Jamie Rhead, Plymouth, MN (US); Brian R. Gattman, Minneapolis, MN (US); Paul Grinberg, Plymouth, MN (US); Matthew H. Skorina, Minneapolis, MN (US); Eugene Skobov, Eden Prairie, MN (US)

(73) Assignee: Fluke Corporation, Everett, WA (US)

( * ) Notice: Subject to any disclaimer, the term of this patent is extended or adjusted under 35 U.S.C. 154(b) by 191 days.

(21) Appl. No.: 15/043,280

(22) Filed: Feb. 12, 2016

(65) Prior Publication Data

US 2017/0206642 A1   Jul. 20, 2017

Related U.S. Application Data

(60) Provisional application No. 62/279,415, filed on Jan. 15, 2016.

(51) Int. Cl.
*G06T 5/50* (2006.01)
*H04N 5/33* (2006.01)
(Continued)

(52) U.S. Cl.
CPC .............. *G06T 5/50* (2013.01); *G06T 7/0069* (2013.01); *G06T 7/0081* (2013.01);
(Continued)

(58) Field of Classification Search
CPC ....................................................... G06T 5/50
See application file for complete search history.

(56) References Cited

U.S. PATENT DOCUMENTS 5,172,236 A  *  12/1992  Takemoto .............. G02B 7/365
                                                        348/355
7,620,265 B1     11/2009  Wolff et al.
(Continued)

FOREIGN PATENT DOCUMENTS

DE   102010019399 A1   11/2011
EP        1348148 A1   10/2003
WO     2012040594 A2    3/2012

OTHER PUBLICATIONS

Stratmann et al.—DE 10 2010 019 399 A1—Google Patent English Translation obtained Oct. 12, 2017—corresponding to Stratmann et al.—DE 10 2010 019 399 A1 filed with Information Disclosure Statement mailed on Apr. 24, 2017 with its accompanying Foreign Patent Document.*

(Continued)

*Primary Examiner* — David Porta
*Assistant Examiner* — Jeremy S Valentiner
(74) *Attorney, Agent, or Firm* — Fredrikson & Byron, P.A.

(57) ABSTRACT

Aspects of the disclosure are directed toward systems and methods for combining aspects of a plurality of indexed images taken at different focus distances in order to generate a final image having objects at a variety of depths remain in focus. High frequency frames associated with each of the plurality of images can be generated, each high frequency frame being representative of the high frequency content of the associated image. The high frequency content in a plurality of regions in each of the plurality of high frequency frames can be analyzed to determine which regions include valid high frequency content. A final image can be generated comprising, for each of the plurality of regions, image data from the image having like index as the high frequency frame having the greatest valid high frequency content in that region.

26 Claims, 10 Drawing Sheets

(51) Int. Cl.
*H04N 5/232* (2006.01)
*G06T 7/00* (2017.01)

(52) U.S. Cl.
CPC ......... *H04N 5/23212* (2013.01); *H04N 5/332* (2013.01); *G06T 2207/10048* (2013.01); *G06T 2207/20016* (2013.01); *G06T 2207/20141* (2013.01); *G06T 2207/20221* (2013.01)

(56) References Cited

U.S. PATENT DOCUMENTS

| | | | |
|---|---|---|---|
| 7,693,331 B2* | 4/2010 | Porikli | G06K 9/00624 |
| | | | 382/174 |
| 7,702,181 B2 | 4/2010 | Gouch | |
| 2004/0080661 A1* | 4/2004 | Afsenius | G02B 7/36 |
| | | | 348/345 |
| 2009/0302219 A1* | 12/2009 | Johnson | G01C 3/08 |
| | | | 250/332 |
| 2011/0149169 A1* | 6/2011 | Oami | G11B 27/034 |
| | | | 348/723 |
| 2013/0044254 A1 | 2/2013 | Tzur | |
| 2013/0050453 A1 | 2/2013 | Bergstrom et al. | |
| 2013/0155249 A1* | 6/2013 | Neeley | H04N 5/33 |
| | | | 348/159 |
| 2015/0269742 A1 | 9/2015 | Bergstrom | |

OTHER PUBLICATIONS

International Search Report for PCT/US2017/013275, dated Apr. 11, 2017, 15 pages.
U.S. Appl. No. 14/837,757, entitled Edge Enhancement for Thermal-Visible Combined Images and Cameras, filed Aug. 27, 2015, 62 pages.

\* cited by examiner

| A | B | C |
|---|---|---|
| D | E | F |
| G | H | I |

Image 1

| J | K | L |
|---|---|---|
| M | N | O |
| P | Q | R |

Image 2

| S | T | U |
|---|---|---|
| V | W | X |
| Y | Z | AA |

Image 3

| 1 | 1 | 3 |
|---|---|---|
| 1 | 2 | 3 |
| 1 | 2 | 3 |

Best Focus Frame

| A | B | U |
|---|---|---|
| D | N | X |
| G | Q | AA |

Final Image

FIG. 11

THROUGH-FOCUS IMAGE COMBINATION

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Traditional images are captured using a single focus distance. This can lead to the misfocus of certain objects in a target scene if there is a wide range of distances between the camera and the objects in the scene. In the case of infrared imaging, an out of focus target can result in less accurate temperature measurement. Moreover, while comparing temperature or heat signature of your target component with other identical components in the field of view, it is important to ensure all the components are completely in focus for accurate comparisons.

To address this issue, a user must take multiple images of a scene with each image having different targets in focus. Then the user must view each image separately to accurately analyze components of the image that may be positioned at a variety of depths. This can make full scene analysis overly time-consuming and cumbersome. Additionally, acquiring such images for comparison, particularly algorithmic based comparison, can be challenging for imagery taken with a hand-held camera, since images can be displaced from one another due to hand-jitter and the like.

SUMMARY

Aspects of the disclosure are directed toward systems and methods for combining aspects of a plurality of images taken at different focus distances in order to generate a final image having objects at a variety of depths remain in focus.

In some instances, a plurality of indexed images captured at a variety of different focus distances can be registered to one another. High frequency frames representative of the high frequency content in corresponding ones of the plurality of images can be generated, each of the high frequency frames being indexed and having like index as its corresponding image. In some examples, each of the images and corresponding high frequency frames can include a plurality of regions such that each region in a high frequency frame corresponds to a region in a corresponding image. In some such examples, a region in a high frequency frame is representative of the high frequency content of the like region in the corresponding image.

In some examples, methods can include the step of determining, for each of a plurality of regions in each of the high frequency frames, if the high frequency content in that region is valid. In some such examples, methods can further include determining, for each of the plurality of regions, the index of the high frequency frame having the greatest valid high frequency content among the plurality of high frequency frames. Methods can further include generating a final image that comprises, for each of the plurality of regions, the image data from the one of the plurality of images having the index corresponding to the index of the high frequency frame having the greatest valid high frequency content.

In various examples, images in the plurality of images can include infrared images, visible light images, or combined infrared and visible light images. Similarly, the final image can comprise image data from infrared, visible light, or combined infrared and visible light images.

In some examples determining whether or not the high frequency content in a region of a high frequency frame is valid comprises comparing the high frequency content of that region to the high frequency content of nearby regions. Nearby regions can include regions within the high frequency frame and/or within frames having an index within a threshold distance of the region such that the frames having such indices correspond to images having focus distances near the focus distance of the image corresponding to the high frequency frame containing the region. Comparing the high frequency content to nearby high frequency content can include determining whether or not the high frequency content is within some threshold value of the maximum high frequency content. Additionally or alternatively, determining whether or not high frequency content is valid comprises comparing the high frequency content to a predetermined validity threshold.

In some examples, methods can include generating a best focus frame, wherein the best focus frame comprises, for each region, the index of the high frequency frame having the greatest valid high frequency content in that region. The best focus frame can be used as a guide for populating each region in the final image with image data from the image having the index designated in that region of the best focus frame.

In various embodiments, methods can include capturing the plurality of images using an imaging device and/or recalling images from a memory. Capturing the plurality of images can include adjusting a focus distance of an imaging device while periodically capturing images so that each of the captured images has a different focus distance.

Embodiments of this disclosure are directed toward cameras or other imaging systems capable of performing such methods.

BRIEF DESCRIPTION OF THE DRAWINGS

FIG. 11 shows a simplified process of generating a final image using a best focus frame.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
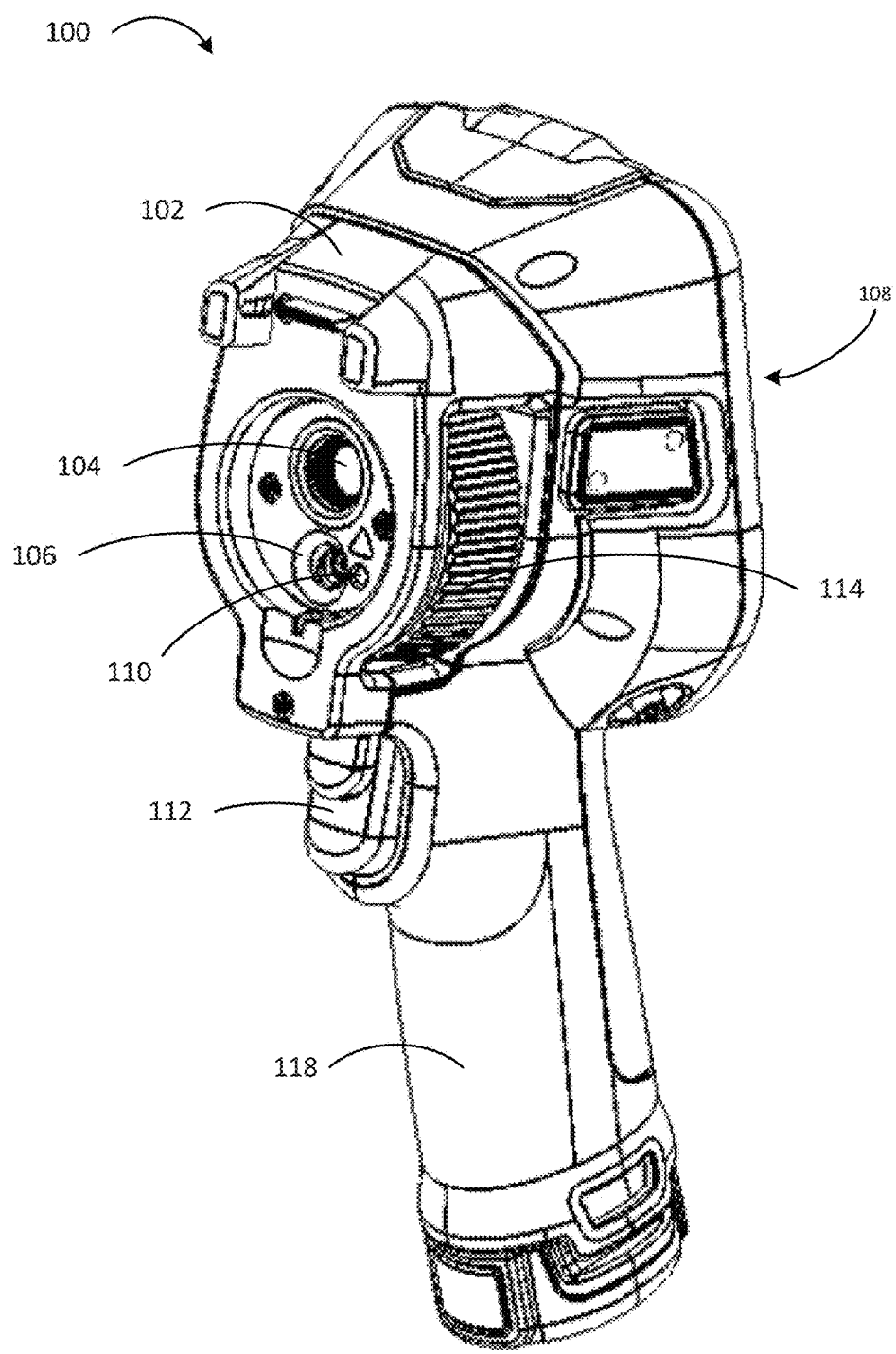
FIG. 1 is a perspective front view of an example thermal imaging camera.
Figure 2:
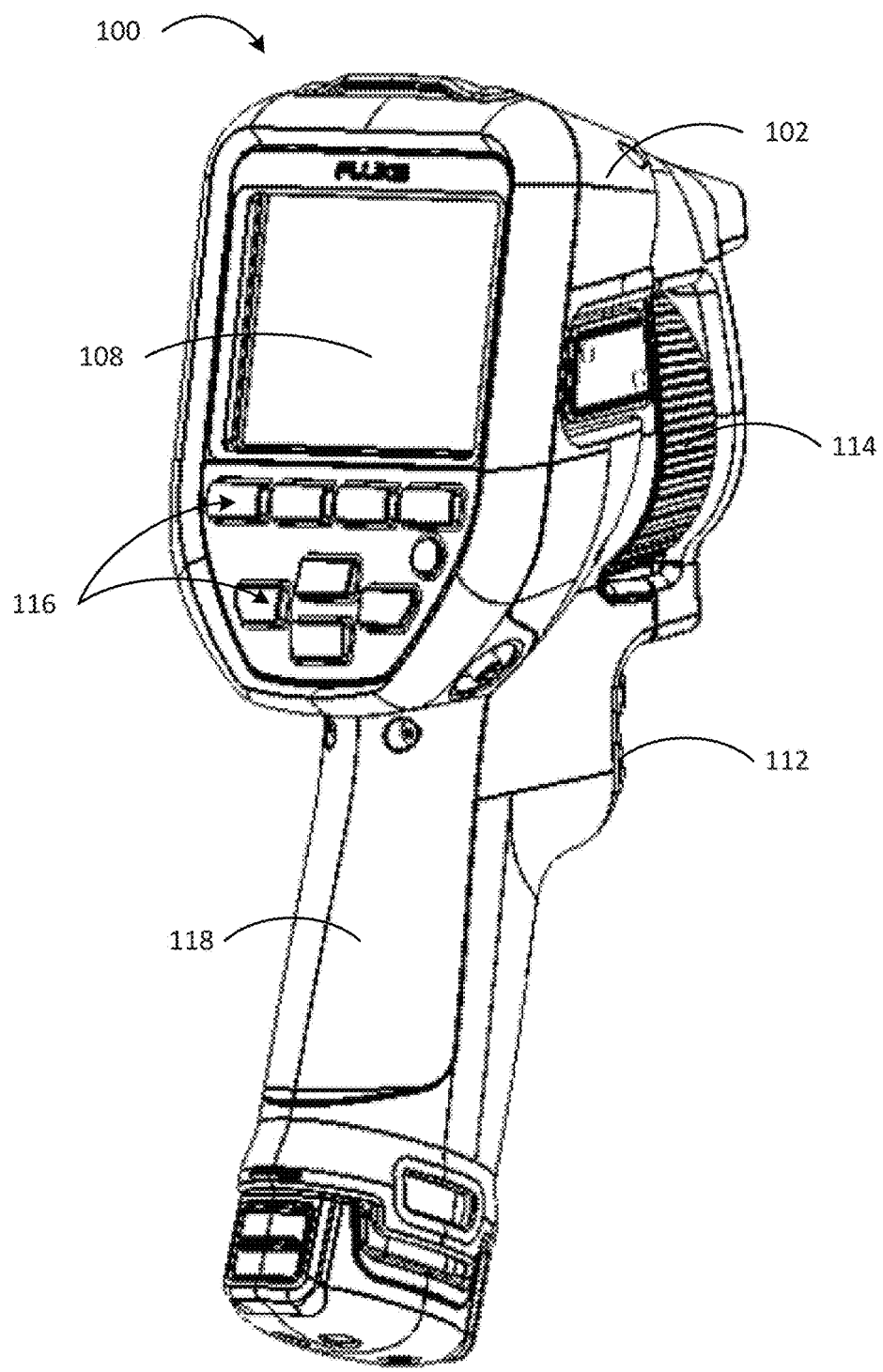
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle 118 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera. Additionally or alternatively, the focus mechanism may move the FPA relative to one or more lenses of the infrared lens assembly.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move one or both of the FPA and the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
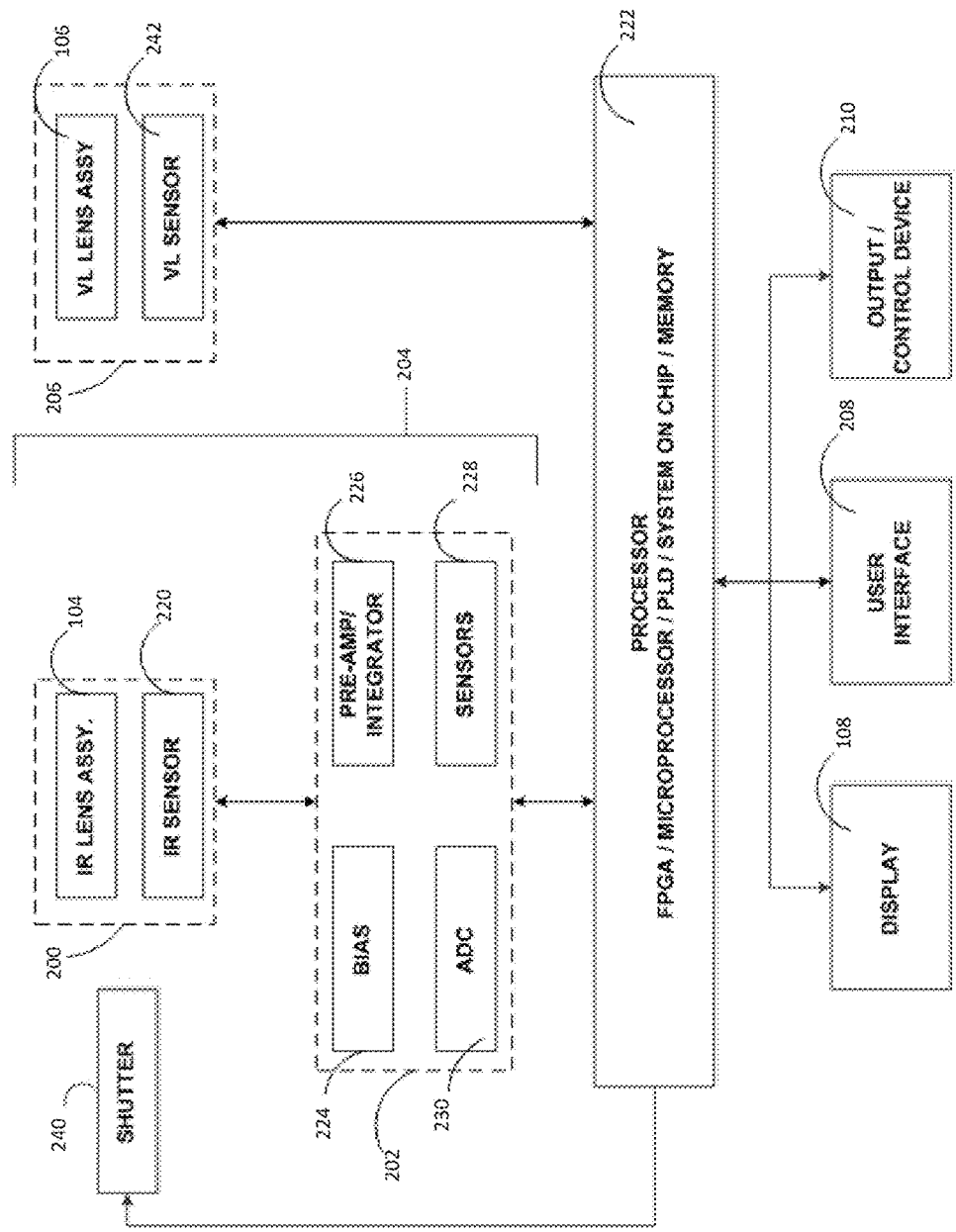
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage 204 or front end components of the thermal imaging camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates some or all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at substantially a given point in time. That is, in some examples, a plurality of pixels making up the infrared image may be captured simultaneously. In other embodiments, sets of one or more pixels may be captured serially until each pixel has been captured.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. In still other examples, a single sensor pixel may contribute to a plurality of display pixels. For example, a value from a single sensor pixel may be replicated at nearby pixels, such as in a simple upsampling procedure. In other examples, neighboring or otherwise nearby pixels may be averaged to create a new pixel value, such as in an interpolation procedure. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108. In some examples, the visible light module 206 is configurable by a user, and can provide output, for example, to display 108, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200. In some examples, the visible light camera module 206 may include its own dedicated processor or other circuitry (e.g., ASIC) capable of operating the visible light camera module 206. In some such embodiments, the dedicated processor is in communication with processor 222 for providing visible light image data (e.g., RGB image data) to processor 222. In alternative embodiments, a dedicated processor for the visible light camera module 206 may be integrated into processor 222.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

In some embodiments, one or both of infrared 200 and visible light 206 camera modules for acquiring IR and VL image data may be included in an image acquisition module 280. The image acquisition module may be in wired or wireless communication with a processing module 290 that includes a processor such as 222. Processing module 290 may receive image data from the image acquisition module 280 and perform subsequent processing steps as will be described herein. In some examples, processing module 290 may include portable processing devices, such as a smartphone, a tablet, a stand-alone computer such as a laptop or desktop PC, or the like. In some such embodiments, various components of front end circuitry 202 may be included in the image acquisition module 280, the processing module 290, or both.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. In various embodiments, the size and/or resolution of the IR and VL images need not be the same. Accordingly, there may exist a set of pixels in one of the IR or VL images that correspond to a single pixel in the other of the IR or VL image, or a set of pixels of a different size. Similarly, there may exist a pixel in one of the VL or IR images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, and/or output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus (e.g., via motorized motion of one or more lenses), opening/closing a shutter, triggering sensor readings, adjusting bias values, etc. Moreover, input signals may be used to alter the processing of the image data that occurs in the processor 222.

Processor can further include other components to assist with the processing and control of the thermal imaging camera 100. For example, as discussed above, in some embodiments, an ADC can be incorporated into the processor 222. In such a case, analog signals conditioned by the front end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale. In other examples, display 108 is configured to display an infrared image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 222. For example, processor 222 may generate values (e.g., RGB values, grayscale values, or other display options) for each pixel to be displayed. Display 108 may receive such information and map each pixel into a visual display.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

In some instances during operation, a target scene can include objects located at a variety of distances from the camera. Moreover, such objects may be objects of interest to a user capturing the image and it is desirable to have all of such objects in focus within a captured image. This allows each object of interest to be more accurately analyzed. However, in some such instances, the differences in distance to the multiple objects may be too large to reasonably focus the camera so that each object is in focus, and acquiring multiple images may be necessary.

As previously described, in some examples, a camera can be configured to capture a plurality of images. Such images can be captured at a variety of intervals, such as the camera's frame rate or some other interval, such as one that is selectable by a user. In alternative embodiments, images can be captured at irregular intervals, such as whenever the camera receives a prompt from a user to capture an image (e.g., via depressing trigger control 112).

Additionally, in some instances, the camera can be used to capture a plurality of images while simultaneously adjusting the focus of the camera. For example, the camera can be used to acquire a plurality of images while a motor drives one or more lenses (e.g., in a lens assembly), thereby adjusting the focus of the camera. In other examples, the camera can be used to acquire a plurality of images while a user manually adjusts the position of one or more lenses to adjust the focus of the camera, such as by actuating focus ring 114.

The resulting set of images comprises a plurality of images of a target scene having different focus distances associated therewith. Depending on the contents of the target scene, different objects may appear to be in-focus in some images and out of focus in other images having a significantly different focus distance. Accordingly, an object of interest located at a first depth might be in focus in one image, while an object of interest located at a second depth might be in focus in a different image. Such images can be combined in order to form an image in which both objects are in focus.

Figure 4:
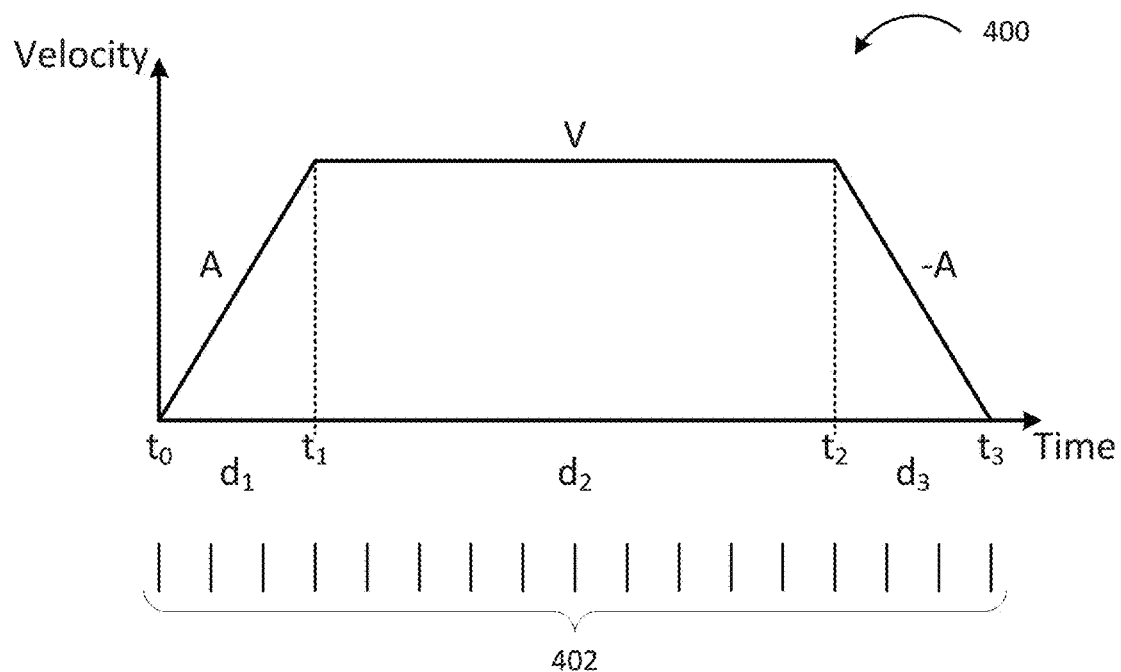
FIG. 4 illustrates an exemplary procedure for acquiring a plurality of images having different focus distances.

FIG. 4 illustrates an exemplary procedure for acquiring a plurality of images having different focus distances. As described, a lens assembly of a camera can be moved in order to adjust the focus of a camera. FIG. 4 shows a plot 400 of velocity of a lens assembly vs. time. In the illustrated example, the lens accelerates at acceleration A to a velocity V from time $t_0$ to time $t_1$, moves at velocity V from time $t_1$ to time $t_2$, and decelerates at acceleration −A to a stop from time $t_2$ to time $t_3$. The velocity profile shown in the plot 400 is exemplary and may correspond to operation of a particular motor-driven lens configuration. In other examples, the velocity profile need not be symmetric or include regions of constant velocity or acceleration. Rather, any motion of the lens assembly to adjust the focus distance of the camera can be used.

In some embodiments, during motion of the lens assembly, a plurality of images can be acquired. In the illustrated embodiment, markers 402 indicate times during the lens motion at which images are captured. As previously discussed, markers 402 may coincide with the frame rate of the camera, an adjustable image acquisition rate, or with manual image capture commands from a user. In some examples, markers 402 may coincide with a subset of images, for example, every nth frame of the original framerate. In some such examples, the camera may discard unused frames.

Since the lens is moving (i.e., Velocity≠0), between times $t_0$ and $t_3$, images captured at each of markers 402 will each have a different focus distance associated therewith. The images captured at markers 402 can be indexed according to capture order. For instance, the first image taken at $t_0$ can be indexed as Image 1, the second image indexed as Image 2, and so on. In some examples, the time at which the image was taken during the lens movement process can be recorded. For example, an image taken at $t_1$ can be associated with time $t_1$ and likewise with other images.

Additionally or alternatively, focus distance information corresponding to the focus distance at which each image is captured can be recorded and associated with respective images. Focus distance information can include the actual focus distance of the camera and/or the position of the lens assembly within the camera when the image is captured. In some embodiments, a camera can determine the focus distance information based on a measured position of the lens assembly at the time of capturing an image, for example, via position sensors or the like. Additionally or alternatively, the camera can use parameters such as lens assembly motion information to determine focus distance information. For example, referring to the velocity profile of FIG. 4, the camera can determine the distance traveled by the lens assembly based on a known or measured velocity or other motion profile of the lens assembly. In the illustrated embodiment of a velocity vs. time plot 400, the area under the curve is representative of the distance traveled by the lens assembly. Additionally or alternatively, a known image capture rate (e.g., a framerate) can be combined with a known motion profile to determine differences in distances between acquired images. Thus, the camera may determine distances such as $d_1$ (the distance traveled between $t_0$ and $t_1$), $d_2$ (the distance traveled between $t_1$ and $t_2$), and $d_3$ (the distance traveled between $t_2$ and $t_3$), and thus relative and/or absolute positions associated with acquired images.

In various examples, motion of the lens assembly can be automated or manually driven via a motor, or manually moved via mechanical actuation of a component by a user. Various properties such as position and/or velocity of the motion can be determined in order to determine focus distance information associated with each captured image. In some embodiments, a camera may perform an automated process to move the lens assembly and acquire images automatically. In some such embodiments, the lens assembly is moved to an initial location (e.g., a nearest focal position), and moved through a range of positions to a final location (e.g., a furthest focal position) while acquiring images during the motion of the lens assembly. Various aspects may be adjustable by a user, such as a starting position, an ending position, a movement velocity, an image capture rate, and the like. As described above, various parameters, such as an image index, acquisition time, and/or focus distance information can be recorded and associated with the acquired images. Additionally, the execution of an image acquisition scheme such as described can be initiated by a camera operator.

As described above, alternatively to automated image capture, any other methods for acquiring a plurality of images taken at a plurality of focus distances may be performed. For instance, any steps of adjusting the camera focus and acquiring images may be performed manually and not according to any particular prescribed schedule. In some such examples, associated time and/or focus distance information can be stored with captured images. Images can be indexed at the time of image capturing or after the images have been captured.

Once a plurality of indexed images of a target scene having different focus distance characteristics have been captured, such images can be processed and combined to create a single image as described above. Such an image can include data from the plurality of images so that portions of the scene located at different distances from the camera may be presented in focus. Such image processing and combining can be performed whether or not the images are captured according to any particular prescribed acquisition technique.

Figure 5:
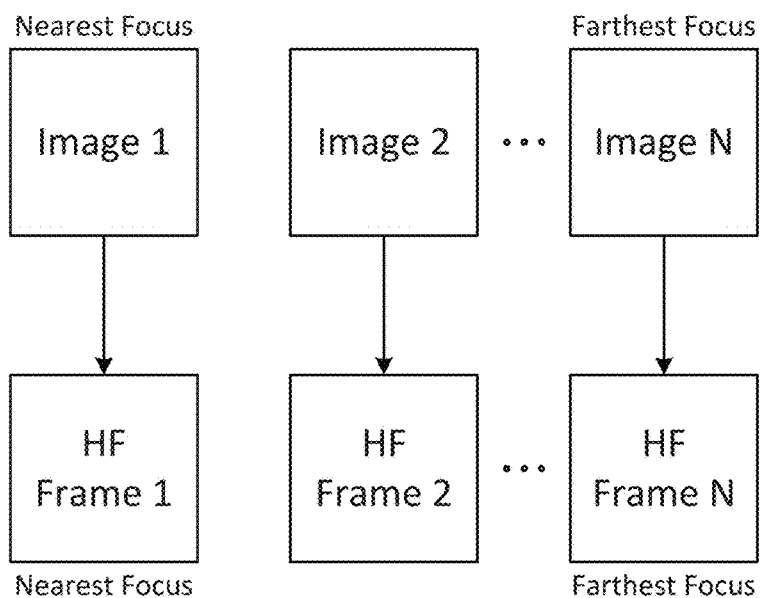
FIG. 5 is an exemplary diagram illustrating a step in an image combining process.

FIG. 5 is an exemplary diagram illustrating a step in an image combining process. As shown, a series of N indexed images, Image 1, Image 2 . . . Image N having different focus distances are used. In the illustrated example, Image 1 is the image having the nearest focus, while image N has the farthest focus. It will be appreciated that this notation is intended to illustrate that the images (e.g., Image 1 . . . Image N) are captured at different focus distances, and that the index (1, 2 . . . N) of each image does not necessarily correspond to its relative focus distance compared to those of other images.

In an exemplary process, each image of the plurality of indexed images is processed to generate a corresponding high frequency frame (HF Frame). As shown, Image 1 is processed to generate HF Frame 1, Image 2 is processed to generate HF Frame 2, etc. Thus, N images are processed to create a corresponding N high frequency frames. In general, each high frequency frame is representative of the high frequency content at corresponding locations in its corresponding image. For instance, a given region in HF Frame 1 is representative of the amount of high frequency content in a corresponding region in Image 1. In various embodiments, regions can correspond to pixels, sets of pixels, or other sections in an image.

Generating a high frequency frame from an image can be performed in a number of ways. In some examples, different edge detection/enhancement techniques, such as those described in U.S. patent application Ser. No. 14/837,757, filed Aug. 27, 2014, and U.S. patent applicant Ser. No. 14/222,153, filed Mar. 21, 2014, each of which is assigned to the assignee of the instant application and is hereby incorporated by reference in its entirety, may be used to generate a high frequency frame, such as a Sobel Operator, a Roberts Cross Operator, or other known operations. Other ways of determining the high frequency content of various regions of an image are possible. In general, each high frequency frame will include regions comprising a value representative of the high frequency content of corresponding regions in the respective acquired image. In some embodiments, the total high frequency content of each image is analyzed and used to define a Reference Frame. That is, in some examples, the Reference Frame is the image in the plurality of images (Image 1, Image 2 . . . Image N) having the highest frequency content, thereby designating an index for the Reference Frame (i.e., the index of the image determined to be the Reference Frame).

In some embodiments, the high frequency frames in the plurality of high frequency frames (e.g., HF Frame 1, HF Frame 2 . . . HF Frame N) are registered relative to one another. In some examples, the registration is performed on the high frequency frames. In an alternative embodiment, the images (e.g., Image 1, Image 2 . . . Image N) are registered relative to one another prior to generating the high frequency frames. Thus, the high frequency frames are already registered due to the registration of the images. In some embodiments, images are registered to the determined Reference Frame.

When registering images, some images are shifted from their original coordinates. For example, an image may be shifted by one or more regions to the left in order to be properly registered with other images. However, this can create blank regions within the image. For instance, if an image shifted one region left, the rightmost regions of the newly registered image may have no data associated where-with, since these regions were previously outside the extent of the image. In such an example, in some embodiments, the blank regions are populated using the data in the region immediately adjacent to the blank region, thereby eliminating any blank regions in the registered images.

Figure 6:
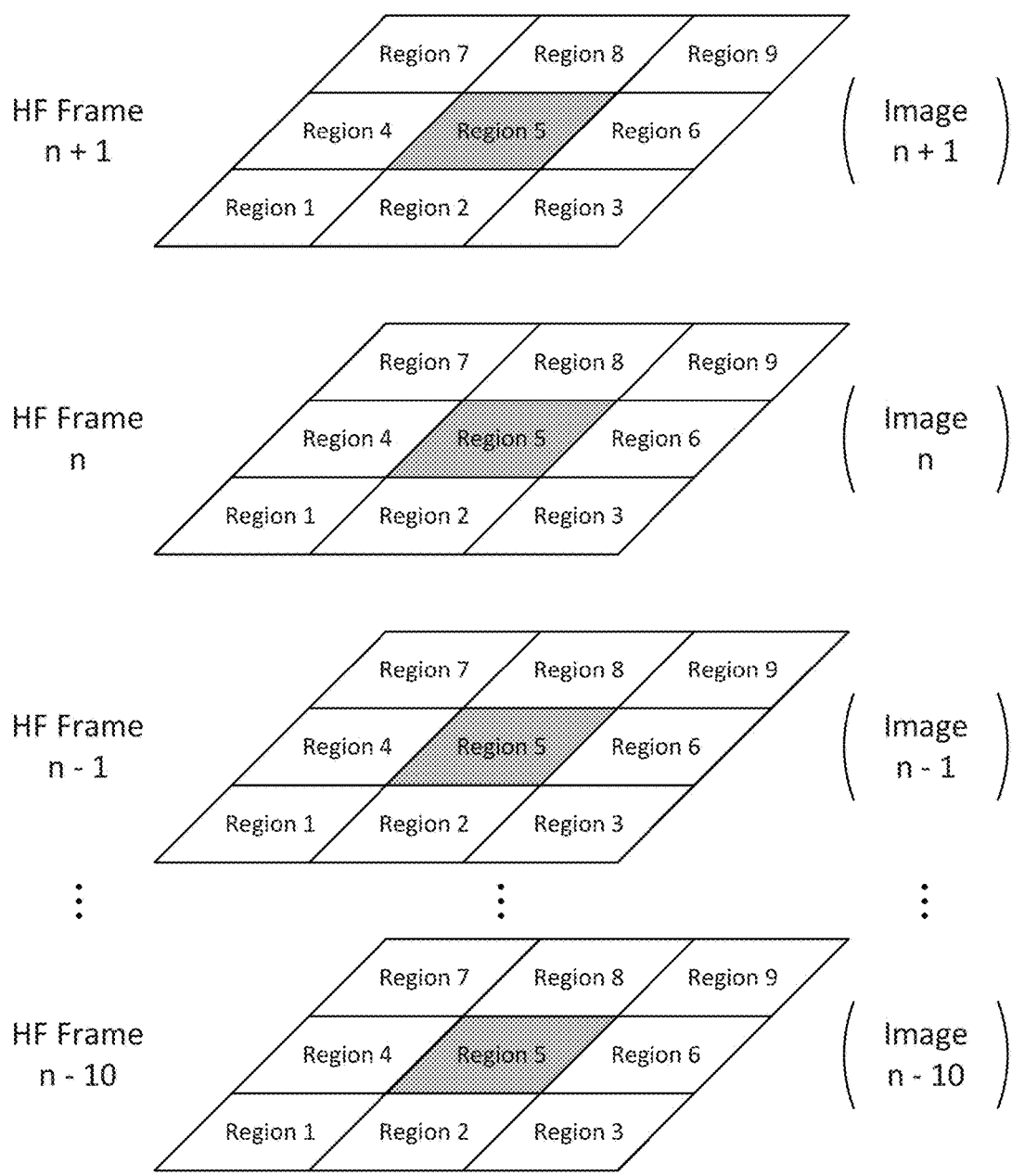
FIG. 6 is a schematic illustration of a plurality of high frequency frames.

FIG. 6 is a schematic illustration of a plurality of high frequency frames. As shown, high frequency frames HF Frame n, HF Frame n+1, HF Frame n−1, and HF Frame n−10 have been generated from corresponding images (indexed Image n, Image n+1, Image n−1, and Image n−10, respectively). Each high frequency frame includes a plurality of regions, such as Regions 4, 5, and 6 in HF Frame n. In various embodiments, regions (e.g., Region 4, Region 5, etc.) can correspond to pixels in the high frequency frame, groups of pixels in the high frequency frame, or any other defined portion of the high frequency frame. In general, regions within each high frequency frame correspond to like regions within corresponding images.

In various embodiments, regions within a high frequency frame (e.g., 4 and 5 in HF Frame n) need not have the same size or shape as one another. In preferred embodiments, each of a plurality of regions in one high frequency frame exists in each of the other high frequency frames. For example, shaded Region 5 in HF Frame n is similarly present in HF Frame n+1 and HF Frame n−1. Like regions in different high frequency frames have like size and shape, and correspond to like portions of the target scene when the high frequency frames are registered. Thus, in some embodiments, regions are not necessarily frame specific, but rather define a portion of the target scene. Such regions are thus present in each of the plurality of images and each of the corresponding high frequency frames.

In general, higher high frequency content tends to correspond to a more in-focus portion of an image, as it is generally indicative of sharp edges. Accordingly, in some embodiments, high frequency frames can be analyzed to determine which parts of which of the plurality of images are the most "in focus." That is, for each region, it can be determined which high frequency frame has the greatest high frequency content. In some embodiments, an index can be assigned to each region, the assigned index being the index of the high frequency frame having the greatest high frequency content in that region. Such indices can be used to construct a final image wherein each region in the final image comprises image data from the corresponding region in the original image having that index.

For example, with reference to FIG. 6, if 3 images were initially captured and three corresponding high frequency frames (HF Frame n−1, HF Frame n, and HF Frame n+1) were generated, such high frequency frames can be compared region-by-region to generate a final image. In an exemplary method, the high frequency content of Region 5 is compared among HF Frame n−1, HF Frame n, and HF Frame n+1. If, for example, the high frequency content represented in Region 5 of HF Frame n is greater than the high frequency content represented in Region 5 of HF Frame n+1 and HF Frame n−1, then the corresponding region in the final image would be generated using the image data from the corresponding region (i.e., Region 5) in Image n (corresponding to HF Frame n).

In some examples, an intermediate step can include creating a best focus frame prior to generating a final image. The best focus frame can be a frame having a plurality of regions, each region corresponding to a region in each image and in each high frequency frame. The value associated with each region in the best focus frame is the index of the high frequency frame having the greatest high frequency content in the respective region. Thus, each region in the best focus frame is populated with an index designating a particular high frequency frame, and thus a particular image. Then, at least conceptually, the final image can be constructed by, for each region, replacing the index, n, in the best focus frame with the image data from the respective region from the image having index n. In theory, this image will include, in each region, the best-focused imaged data from the plurality of images.

In some embodiments, the plurality of images comprises a plurality of infrared images having different focus distances. In some examples, the each of the plurality of infrared images is captured with an associated visible light image having a like index as its associated infrared image. Each visible light image can be registered with its associated infrared image by any appropriate image registration process.

As described, the plurality of infrared images are registered and used to generate a plurality of high frequency frames, which are subsequently analyzed in order to generate a best focus frame comprising a plurality of indices as described. The indices are used to generate a final infrared image. In some examples, the best focus frame can be used to generate a final visible light image associated with the final infrared image. That is, the index in each of the plurality of regions of the best focus frame can be used to generate a visible light image comprising, in each of the plurality of regions, the visible light image data from that region in the visible light image having the index referenced in the best focus frame. The resulting final visible light image then includes visible light image data corresponding region-by-region to the infrared image data in the final infrared image. The final infrared image and final visible light image can be combined according to any of a variety of known processes, such as via alpha blending, picture-in-picture display, and the like.

Figure 7:
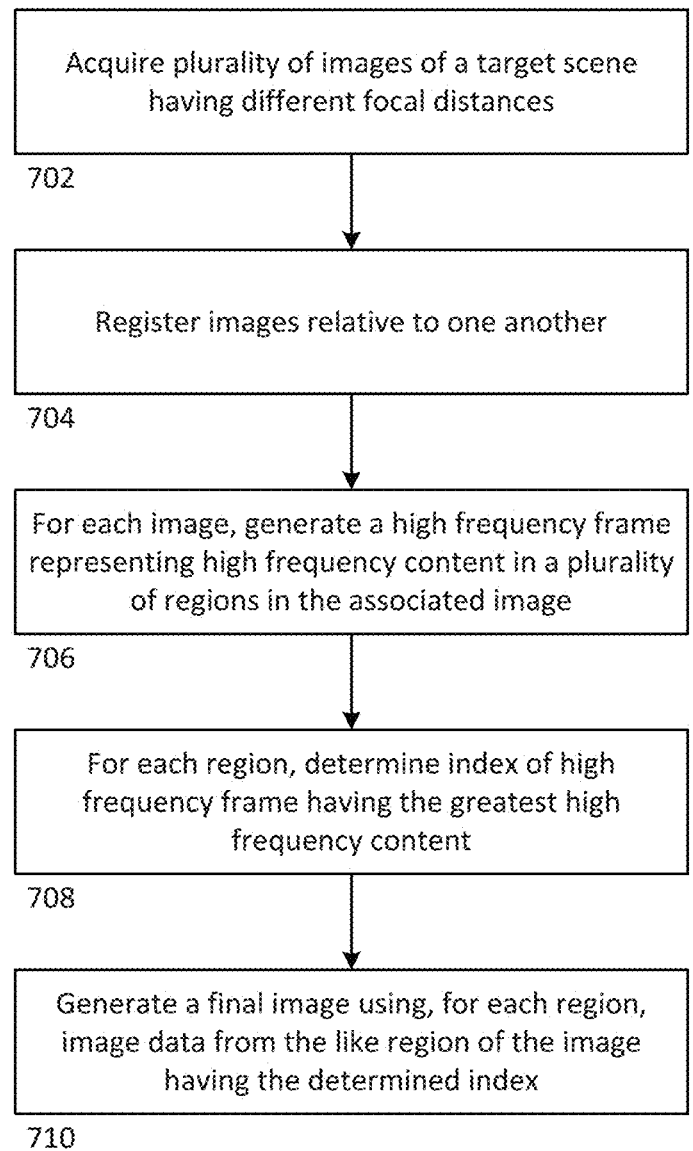
FIG. 7 is an exemplary process-flow diagram illustrating an exemplary process of generating a final image using a plurality of captured images having different focus distances.

FIG. 7 is an exemplary process-flow diagram illustrating an exemplary process of generating a final image using a plurality of captured images having different focus distances. The exemplary method includes acquiring a plurality of images of a target scene having different focus distances (702). Acquiring the images can include capturing the images, such as described in various exemplary processes elsewhere herein, recalling such images from memory, receiving such images from a separate device, or any other method of acquiring such images.

The method further includes registering the images relative to one another (704). As described previously, in some examples, a reference frame can be determined and used as the frame to which other images are registered. The method includes, for each image, generating a high frequency frame representing high frequency content in a plurality of regions in the associated image (706). Thus, the high frequency content in a plurality of regions in each image is determined.

The method further includes, for each region, determining the index of the high frequency frame having the greatest high frequency content (708). Once such an index is determined for each region, a final image can be generated using, for each region, image data from the like region of the image having the determined index (710). The final image includes image data from one or more of the captured images, and the image from which the image data in each region in the final image is selected is determined based on the high frequency content of that image in that region.

Figure 8A:
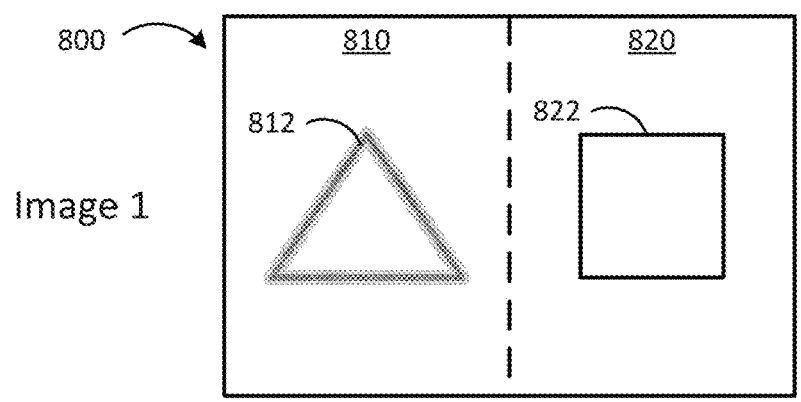
FIGS. 8A-8C illustrate an exemplary process such as that described in FIG. 7.
Figure 8B:
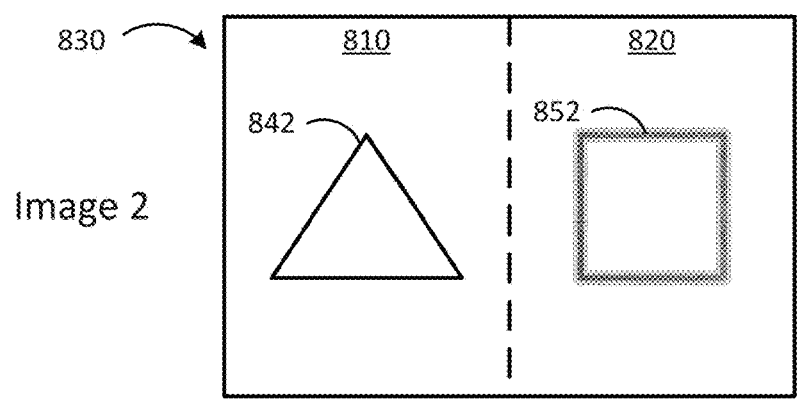
Figure 8C:
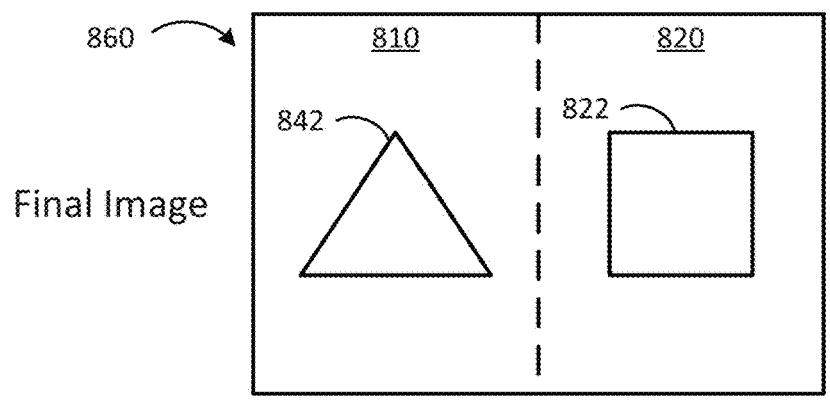

FIGS. 8A-8C illustrate an exemplary process such as that described in FIG. 7. FIG. 8A shows a first image 800 (Image 1). The first image 800 includes a triangle 812 located in a first region 810 and a square 822 located in a second region 820. As shown, in the first image 800, the square 822 in the second region 820 appears to be in focus while the triangle 812 in the first region 810 appears to be out of focus. FIG. 8B shows a second image 830 (Image 2) of the same scene, only captured using a different focus distance. The second image 830 similarly includes a triangle 842 located in the first region 810 and a square 852 located in the second region 820. However, at the focus distance of the second image 830, the triangle 842 in the first region 810 appears to be in focus while the square 852 in the second region 820 appears to be out of focus.

FIG. 8C shows a final image 860 (Final Image) that can be created using methods such as described in FIG. 7. As shown, the first region 810 of the final image includes triangle 842 from the first region 810 of the second image 810, while the second region 820 includes the square 822 from the second region 820 of the first image 800. That is, the first 810 and second 820 regions each include the image data from the image in which the image data in that region is more in focus. In the context of the method of FIG. 7, a comparison of the high frequency content of the first region 810 of Image 1 (800) and the high frequency content of the first region 810 of Image 2 (830) would show the high frequency content of the second image 830 is greater than that of the first 800 in the first region 810. Thus, image data from the first region 810 of the second image 830 is used in the final image. Similarly, image data from the second region 820 of the first image 800 is used in the final image.

While, as described previously, higher frequency content corresponds to a more in-focus image, in some instances, relatively large high frequency content may be present in an out-of-focus image as well. For example, a sharp edge in one region of an in-focus image can contribute to high frequency content in that region. However, as the edge becomes less focused as the focus distance is adjusted, the edge may blur and spread into adjacent regions, thus lowering the high frequency content of the original region and increasing the high frequency content of such adjacent regions. For instance, with reference to FIG. 6, high frequency content may be present in regions 2, 5, and 8 in HF Frame n due to an in-focus edge present in corresponding Image n across such regions. However, due to different focus distances used when capturing Image n+1 and Image n, such a line may blur and spread into regions 1, 4, and 7 in Image n+1, contributing to high frequency content in these regions in HF Frame n+1. Thus, regions 1, 4, and 7 in HF Frame n+1 may include high frequency content as an artifact of a focused edge in Image n, despite the edge being misfocused in Image n+1.

This can lead to problems in creating the final image. One such example can occur near the location of a sharp edge in a nearby frame. In such an example, a certain region contains the defocused image of a nearby edge. The defocused location may have a large high frequency value as compared to sharpened background information. The high frequency content of this blurred edge should be ignored, but instead may undesirably contribute to the final image. For example, with reference to FIG. 6, if the high frequency content in regions 1, 4, and 7 in HF Frame n+1 is greater than the high frequency content in corresponding regions 1, 4, and 7 in HF Frame n−10, image data from Image n+1 will be used instead of image data from Image n−10. However, the high frequency content in regions 1, 4, and 7 in HF Frame n+1 is merely an artifact from an in-focus edge in Image n. If regions 1, 4, and 7 in HF Frame n−10 include true (non-artifact) high frequency content from an in-focus object in Image n−10, such an object may appear out of focus in the final image if image data from Image n+1 is used instead of from Image n−10. Accordingly, it can be useful to determine which high frequency content in the high frequency frames correspond to true in-focus objects in the corresponding images and which high frequency content is due to artifacts from misfocused images in corresponding images.

Accordingly, in some embodiments, methods can include determining the validity of high frequency content in the high frequency frames. If high frequency content in a certain region in a certain high frequency frame is determined to be invalid, such high frequency content may be excluded when determining which high frequency frame has the greatest high frequency content for that region (e.g., step 708 in FIG. 7). Additionally or alternatively, such high frequency content for that region in that high frequency frame may be adjusted (e.g., sent to zero) so that its associated frame will not be determined to be the frame having the greatest high frequency content for the region.

Figure 9:
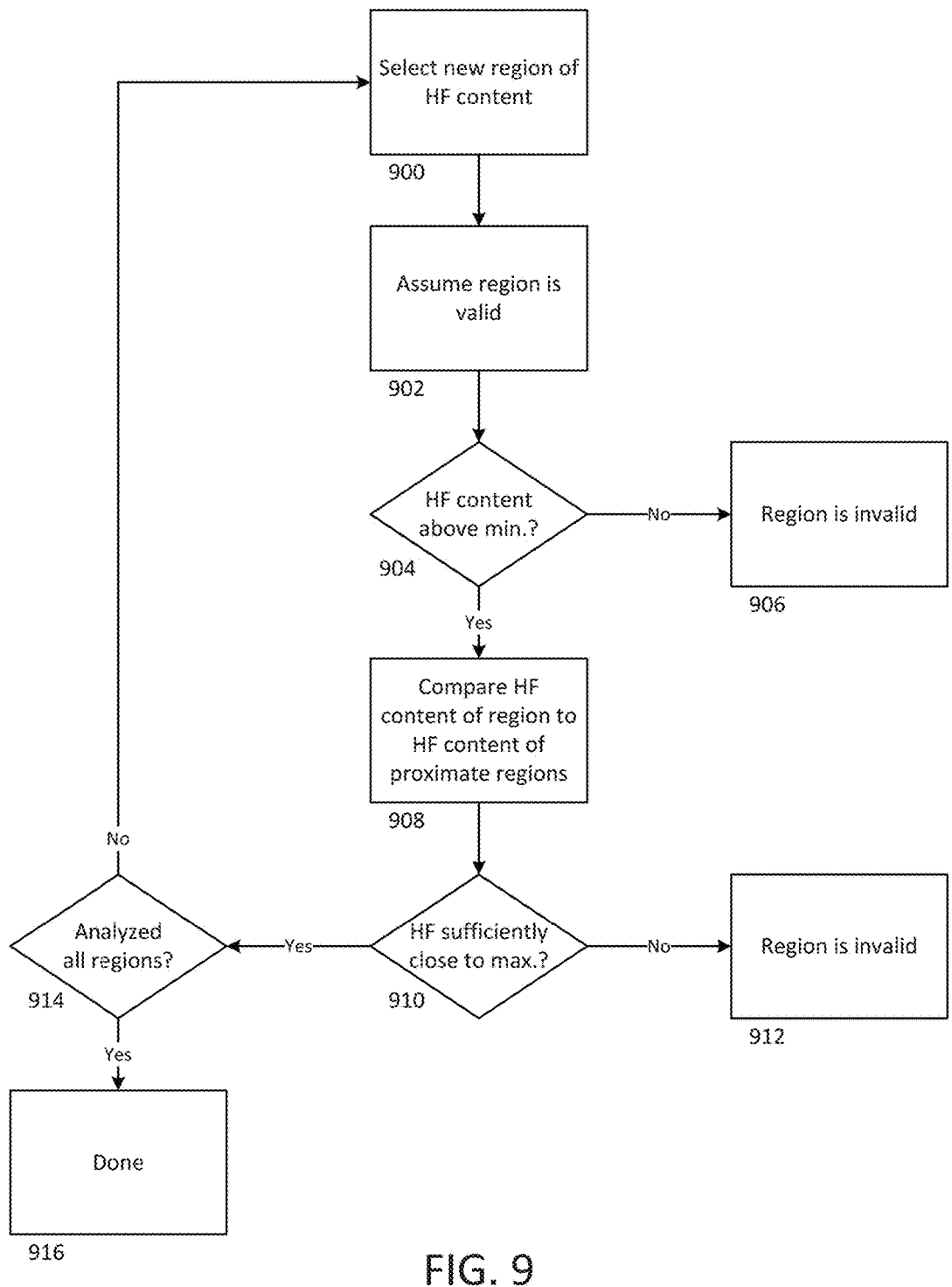
FIG. 9 is a process flow diagram illustrating an exemplary method for determining whether or not a region is valid.

In some examples, determining the validity of high frequency content in a region comprises comparing the amount the high frequency content in that region (i.e., the value of the high frequency frame in that region) to the amount of high frequency content in nearby regions. FIG. 9 is a process flow diagram illustrating an exemplary method for determining whether or not a region is valid. In the method of FIG. 9, a region of high frequency content is selected (900), such as a region from a high frequency frame. In exemplary method of FIG. 9, it is assumed that the region is valid (902). The high frequency content of the region is compared to a minimum high frequency content value (904). If the high frequency content is not above the minimum value, the region is considered invalid (906). In various examples, the minimum high frequency content value of step 904 can be predetermined or adjustable by a user. In some examples, step 904 can be effectively omitted if the minimum high frequency content value is set to zero.

The high frequency content of the selected region is compared to the high frequency content of proximate regions (908). Proximate regions can be considered to be proximate to the selected region in a spatial context, wherein the proximate regions are in the same frame as the selected region and within a certain neighborhood as the selected region. Additionally or alternatively, proximate regions can be considered to be proximate to the selected region based on index. That is, a region from a frame captured within a certain number of frames prior or subsequent to the capturing of the frame of the selected region can be considered proximate.

After comparing to the proximate regions, it can be determined whether or not the high frequency content is sufficiently close to the maximum high frequency content within the proximate regions (910). That is, the high frequency content of the selected region can be compared to a local maximum within the set of regions defined to be proximate the selected region. If the high frequency content of the selected region is not sufficiently close to the local maximum value, the selected region is considered invalid (912). Otherwise, it can be determined whether or not all regions have been analyzed (914). If not, a new region can be selected (900) and the process can be repeated. Otherwise, the validity determination is complete (916). It will be appreciated that alternatives to the method of FIG. 9 can be performed with similar resulting validity determinations. For example, in alternative embodiments, each region is assumed to be invalid. If the HF content is above the minimum (e.g., in step 904) and is sufficiently close to the local maximum (e.g., in step 910), then the region is made valid.

An exemplary validity determination can be demonstrated with reference to FIG. 6 while using the method described in FIG. 9. In performing an exemplary determination, Region 5 can from HF Frame n is selected (e.g., step 900). It is assumed that Region 5 in HF Frame n is valid (e.g., step 902). The high frequency content of Region 5 in HF Frame n can be compared to a minimum high frequency threshold (e.g., step 904), wherein if the high frequency content is below the threshold, Region 5 in H Frame n is invalid (e.g., step 906).

If the threshold is met, the high frequency content of Region 5 is compared to the high frequency content of proximate regions. Which regions constitute proximate regions can vary between embodiments. In some examples, such a parameter can be set by a user. For instance, in an exemplary embodiment, regions proximate to a particular region in a given high frequency frame can include any immediately adjacent region in the same frame or an adjacent frame. Used with respect to Region 5 in HF Frame n in the example of FIG. 6, proximate frames can include Regions 1-9 in HF Frame n−1, HF Frame n, and HF Frame n+1. Thus, in such an embodiment, there are 27 regions included in the neighborhood surrounding Region 5 in HF Frame n (including itself). The high frequency content of Region 5 in HF Frame n can be compared to the high frequency content within the proximate regions (e.g., step 908). If the high frequency content of Region 5 in HF Frame n is not sufficiently close to the local maximum within the defined neighborhood (e.g., step 910), then Region 5 in HF Frame n is invalid (e.g., step 912).

Determining whether or not the high frequency content of a particular region is sufficiently close to the local maximum can be performed in a variety of ways. In some examples, an invalidity scaling parameter is used to determine whether or not the high frequency content of the particular region is sufficiently close to the local maximum. For instance, an invalidity scaling parameter of 75% (or of 0.75) can be used, indicating that the high frequency content of the region is sufficiently close to the local maximum if it is at least 75% the local maximum value. In another embodiment, statistical analysis can be used to determine if the high frequency content is sufficiently close to the local maximum, such as within the 75% percentile of high frequency values of the proximate regions.

Allowing for regions that do not include the maximum high frequency content in the surrounding neighborhood of regions to be considered valid can help prevent undesired invalid region designations. For example, if a focused edge extending through multiple neighboring regions is present in a single image, valid high frequency content is likely present such regions in the corresponding high frequency frames. Deeming non-maximum regions within a neighborhood to be invalid may result in some regions that include such an edge being considered invalid. However, allowing for regions that have high frequency content sufficiently close to the local maximum may allow such regions to be considered valid despite possibly not having locally maximum high frequency content. In some embodiments, the requirements for what constitutes "sufficiently close," including the type of comparison (e.g., threshold, statistical, and the like) and/or the comparison value (e.g., an invalidity scaling parameter) are selectable by a user in order to adjust the sensitivity of the validity determination process.

Once it is determined whether or not the high frequency content of a region (e.g., Region 5 in HF Frame n) is sufficiently close to the local maximum, a check is performed to determine if all regions have been analyzed (e.g., step 914). If so, the validity determination process is complete. If not, a new region can be selected (e.g., Region 4 in HF Frame n) and the process is repeated.

Figure 10:
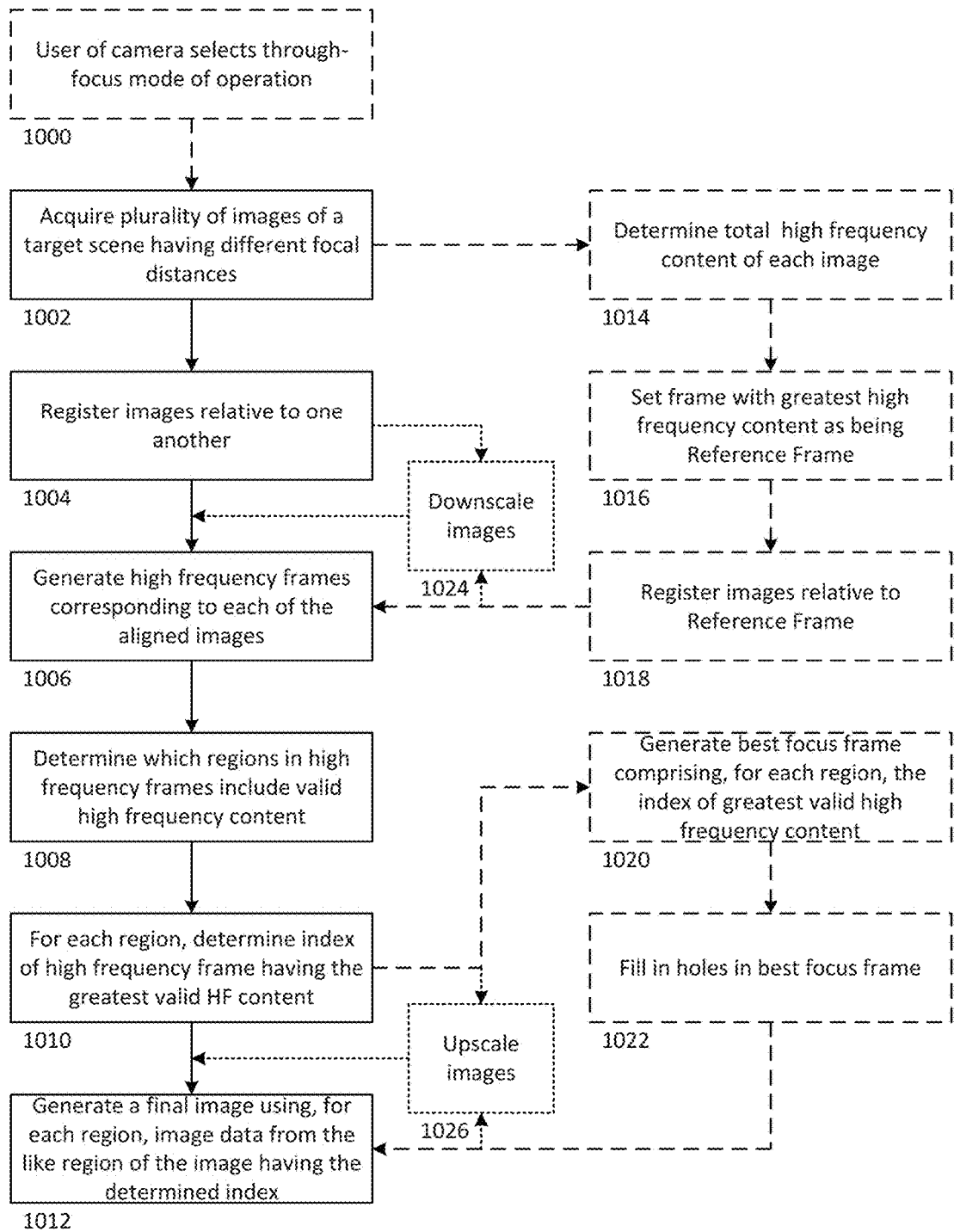
FIG. 10 is a process flow diagram illustrating exemplary methods for generating a final image while excluding invalid regions.

Designating valid and invalid regions in the high frequency frames can greatly impact the outcome of generating a final image. FIG. 10 is a process flow diagram illustrating exemplary methods for generating a final image while excluding invalid regions. Similar to the method described in FIG. 7, the process can include the step of acquiring a plurality of images of a target scene, the images having different focus distances (1002). As described elsewhere herein, acquiring the plurality of images can be performed in a variety of ways, such as capturing such images with a camera, recalling such images from memory, and the like. In some examples, the image acquisition step (1002) is preceded by a user of a camera selecting a through-focus mode of operation (1000). This can cause the camera to execute a focusing and image acquisition process such as described with reference to FIG. 4 in order to acquire the images for use in the process. The method includes registering the images relative to one another (1004) and generating high frequency frames corresponding to each of the registered images (1006). Registering images allows the process to be performed using images taken in an unsteady environment. For example, a user holding a camera capturing the plurality of images need not hold the camera perfectly still while capturing the images, and the image processing techniques can still be performed successfully. Additionally, or alternatively, vibrations or other slight movement of the scene can be compensated for using image registration.

The method of FIG. 10 includes the step of determining which regions in the high frequency frames include valid high frequency content (1008). In general, this can be performed, for example, as described with respect to FIG. 9. However, implementing the validity determination can be performed in a variety of ways. In some examples, high frequency content determined to be invalid is eliminated from the high frequency frame. That is, the high frequency content is replaced with a zero or other value so that the invalid high frequency content does not affect any subsequent determinations using the high frequency content data.

In other embodiments, for each of the high frequency frames, a corresponding validity mask can be generated. The validity mask can be an array of binary values, each value associated with a corresponding region in the corresponding high frequency frame. That is, if a region in a high frequency frame is considered invalid, then the corresponding region in the corresponding validity mask is a zero. Otherwise, the corresponding region in the corresponding validity mask is a one.

The method of FIG. 10 includes, for each region, determining the index of the high frequency frame having the greatest valid high frequency content (1010). Then, similarly to the method described in FIG. 7, the method of FIG. 10 includes generating a final image using, for each region, image data from the like region of the image having the determined index (1012). However, in contrast to the method of FIG. 7, the method of FIG. 10 only determines such indices using valid high frequency content. That is, when comparing high frequency content in like region among frames, only valid high frequency content is considered. For example, in some embodiments, invalid high frequency content for a particular region is forced to zero, and thus such a region will not have the greatest high frequency content. In other embodiments, when determining, for each region, the index of the high frequency frame having the greatest valid high frequency content, a region from a high frequency frame only used in the determination when the corresponding validity mask value is one. Otherwise, the high frequency content of such region in such high frequency frame is omitted from the determining.

Disregarding invalid high frequency content can help eliminate errors due to ghosting, haloing, or other artifacts when constructing a final image. Referring to a previous example with further reference to FIG. 6, high frequency content in Region 7 in HF Frame n+1 due to the spreading of a misfocused edge in Image n+1 that is in focus in Image n may be determined to be invalid. In such a situation, the sharp, focused edge in Region 5 in Image n results in a large amount of high frequency content in Region 5 in corresponding HF Frame n. The defocused edge visible in Region 7 of Image n+1 contributes high frequency content to Region 7 in corresponding HF Frame n+1. However, the high frequency content contribution by the blurred edge to Region 7 in HF Frame n+1 will be significantly lower than the high frequency content contribution from the sharp, focused edge to Region 5 in HF Frame n.

Thus, in some examples, if Region 5 in HF Frame n and Region 7 in HF Frame n+1 are considered proximate to one another, the high frequency content in Region 5 of HF Frame n can render the comparatively lower high frequency content in Region 7 in HF Frame n+1 to be invalid. Accordingly, even if the high frequency content (due to artifacts) in Region 7 of HF Frame n+1 is greater than the high frequency content in Region 7 in HF Frame n−10 corresponding to a focused object in Image n−10, the image data from Image n−10 may be used to construct the final image, Region 7 in HF Frame n+1 is deemed invalid. That is, the high frequency content of Region 7 in HF Frame n+1 is not considered when determining the index of high frequency frame having the greatest high frequency content in Region 7.

As described elsewhere herein, the total high frequency content of the plurality of images (e.g., via analysis of the corresponding high frequency frames) can be used to determine a Reference Frame having the greatest total high frequency content. In some embodiments, the Reference Frame can refer to an index, thus being associated with both an image and a corresponding high frequency frame having like indices. Accordingly, in some embodiments, the method can include step of determining the total high frequency content of each image (1014) and setting the frame with the greatest high frequency content as the Reference Frame (1016). Image registration can comprise registering images relative to the Reference Frame (1018). Steps 1014, 1016, and 1018 can be performed as a sequence to achieve image registration, and may be used in addition to or in lieu of step 1004.

In some examples, generating a final image such as in step 1012 comprises generating a best focus frame comprising, for each region, the index of the frame having the greatest high frequency content. FIG. 11 shows a simplified process of generating a final image using a best focus frame. In the illustrated example, three images, Image 1, Image 2, and Image 3 each comprising nine regions having image data designated by different letters. The images can be processed as described elsewhere herein to determine, for each region, the index of the image includes the greatest valid high frequency content. This information can be used to generate a best focus frame.

The best focus frame of FIG. 11 includes nine regions corresponding to the nine regions from each of the images. As described, the value in each region in the best focus frame is the index of the image (and corresponding high frequency frame) having the greatest valid high frequency content in that region. For instance, the upper-left region of the Best Focus Frame has a "1," indicating that Image 1 has the greatest valid high frequency content in the upper-left region among all images.

As described, in generating the final image, for each region in the final image, image data from the like region of the image having the index of the high frequency frame having the greatest high frequency content in that region, which is the value in the best focus frame in that region. Since the value of the upper-left region in the best focus frame is "1", the image data from the upper-left region in Image 1 is used to generate the upper-left region in the final image. As shown, the image data in the upper-left region of Image 1 is represented by "A." Thus, the image data in the upper-left region of the final image is also "A." Similarly, since the value of the lower-right region in the best focus frame is "3", the image data from the lower-right region in Image 3 ("AA") is used as the image data in the lower-right region in the final image.

Referring back to FIG. 10, the method for generating the final image can include generating a best focus frame (1020) by determining the index of the high frequency frame having the greatest valid high frequency content. However, in some situations, there could be regions in which no frames include valid high frequency content. That is, for a certain region, there may be no frames in which the high frequency content in that region both exceeds some minimum value (e.g., step 904 of FIG. 9) and is sufficiently close to the local maximum (e.g., step 910 in FIG. 9), rendering the region invalid across each frame. Thus, there may exist holes (i.e., regions having no value) in the best focus frame, since no index exists for images having valid high frequency content in such regions.

In some embodiments, dilation processes fill these holes in the best focus frame. For example, index values in regions bordering such holes can be applied to such holes using standard dilation processes. In some embodiments, a series of dilation processes can be performed until all of the holes are filled, or dilation processes no longer fill remaining holes. In some such instances, all remaining holes are filled with the index of the determined Reference Frame (e.g., as determined in step 1016). Such steps can be used to fill holes in the best focus frame (1022) prior to generating the final image (1012).

As described elsewhere herein, in some examples, the acquired plurality of images (e.g., from step 1002) includes a plurality of infrared images each being captured with an associated visible light image. In some examples, steps 1004-1010 and steps 1020 and 1022 can be performed using the infrared images. In some such examples, step 1012 can include generating a final infrared image using, for each region, image data from the like region of the infrared image having the determined index referenced in the best focus frame. In some embodiments, step 1012 can be repeated using visible light images. That is, in some embodiments, the best focus frame generated in step 1020 can be used to generate a final visible light image associated with the final infrared image and comprising, for each region, image data from the like region of the visible light image having the determined index referenced in the best focus frame.

In some embodiments, to save on processing time, images can be downscaled (1024) prior to performing various processing steps. For example, as shown in FIG. 10, the images can be downscaled after registering the images (1004), but prior to generating the high frequency frames corresponding to such images (1006). In other embodiments, the downscaling can be performed at other points in the method, such as prior to determining which regions include valid high frequency content (1008). In some examples, downscaling can include downsampling the images so that each downscaled image includes fewer pixels than the original image. In other examples, downscaling can include adjusting a region size (e.g., a number of pixels associated with each region) in order to effectively process fewer regions without modifying the images. Any of a variety of downscaling steps can be performed.

If a downscaling processes has been performed, in some embodiments, the processes further includes upscaling the images (1026), which can be performed, for example, prior to generating the final image (1012). In some examples, upscaling the image comprises performing the reverse processes as downscaling the images. This helps recover resolution lost due to the original downscaling process.

It will be appreciated that the methods described herein can be carried out in a variety of ways and by a variety of devices. For example, in some embodiments, methods herein described can be executed using a camera capable of acquiring a plurality images at a plurality of focus distances. The camera can execute an operation to both acquire the plurality of images having a plurality of focus distances, such as via methods described herein, and process the images to generate a final image. In some embodiments, a user may actuate automated execution of methods described herein. For example, a user can command the camera to adjust the focus by moving a lens assembly (such as IR lens assembly 104) from a first position (associated with a first focus) to a second position (associated with a second focus). The camera can move the lens assembly automatically via, for example, a motor. The camera can acquire a plurality of images while the lens is in a plurality of different positions between the first position and the second position during the lens motion, thus acquiring a plurality of images having a plurality of focus distances. Since some objects located at different depths in the scene will appear to be in focus in images having different focus distances, not all objects will appear in focus in a single image. Thus, an image viewing a live view of the target scene, for example, via display 108, may observe a scene in which not all objects are in focus. The user may initiate a through-focus process such as those described herein and achieve a fully focused image despite observing at least a partially unfocused image on the display and without having to perform any manual focusing procedures. In some cases, a user may observe a target scene via display 108 that is at least partially misfocused, and in response, trigger a through-focus process such as those described herein in order to generate a more fully focused final image. The final image that is generated can be saved in memory and/or displayed to the user.

In addition to such automated operation, in some examples, a user can manually perform the image acquisition process by repeatedly capturing images and adjusting the focus of the camera, and the camera can subsequently process the images to generate a final image.

Additionally or alternatively, automatically or manually captured images having different focus distances can be transferred to a separate computer or other processing device, such as a smartphone, tablet, or the like, for subsequent processing. The separate device can be capable of performing processes described herein in order to generate a final image from the plurality of images.

In various embodiments, images can include infrared images, visible light images, or combinations thereof, such as blended images and/or images displayed as a picture-in-picture display. In some embodiments, corresponding infrared and visible light images are captured during image acquisition. In some such embodiments, the visible light images can be used to register the infrared images relative to one another or vice versa.

The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various embodiments have been described. Such examples are non-limiting, and do not define or limit the scope of the invention in any way. Rather, these and other examples are within the scope of the following claims.

The invention claimed is:

1. A method for generating an image from a plurality of images, each of the plurality of images having been captured at a different focus distance and having a unique index, the method comprising:
   registering each of the plurality of images relative to one another;
   generating, from each of the registered images, a high frequency frame, each high frequency frame being representative of the high frequency content of the corresponding image and having an index corresponding to the unique index of the respective image;
   determining, for each of a plurality of regions in each of the high frequency frames, whether or not the high frequency content in that region is valid and not due to artifacts by comparing the amount of high frequency content in a given region to the amount of high frequency content in nearby regions and/or to a high frequency content validity threshold;
   for each of the plurality of regions, determining the index of the high frequency frame having the greatest valid high frequency content among the plurality of high frequency frames; and
   generating a final image comprising, for each of the plurality of regions, the image data from the one of the plurality of images having the unique index corresponding to the index of the high frequency frame having the greatest valid high frequency content in that region.

2. The method of claim 1, wherein each of the plurality of images comprises an infrared image, and wherein the final image comprises an infrared image.

3. The method of claim 2, further comprising determining which of the plurality of infrared images contains the greatest total valid high frequency content and defining this image to be the reference frame.

4. The method of claim 3, wherein registering each of the plurality of infrared images to one another comprises correlating each of the plurality of infrared images with the reference frame.

5. The method of claim 2, further comprising downscaling each of the plurality of images prior to generating the high frequency frames and upscaling the images prior to generating the final infrared image.

6. The method of claim 2, further comprising generating best focus frame comprising a plurality of regions, each region in the best focus frame corresponding to one of the plurality of regions in each high frequency frame, the best focus frame including, in each of the plurality of regions, the index of the high frequency frame having the greatest valid high frequency content in that region.

7. The method of claim 6, wherein each of the plurality of infrared images has an associated visible light image having like index as the associated infrared image, each visible light image being registered with the associated infrared image and having a plurality of regions corresponding to the plurality of regions of the associated infrared image, the method further comprising the step of generating a final visible light image, the final visible light image comprising, in each of the plurality of regions, visible light image data from the visible light image having the index designated in that region in the best focus frame.

8. The method of claim 6, wherein, further comprising performing one or more dilation processes on the regions in the best focus frame having greatest valid high frequency content in the plurality of high frequency frames to fill regions of the best focus frame having no corresponding region in any of the high frequency frames having greatest valid high frequency content.

9. The method of claim 8, further comprising:
determining which of the plurality of infrared images contains the greatest total valid high frequency content and defining this image to be the reference frame; and
for regions in the best focus frame having no greatest valid high frequency content in the plurality of high frequency frames and not filled by the one or more dilation processes, including image data from that region in the reference frame in the final image.

10. The method of claim 2, wherein determining, for each of a plurality of regions in each of the high frequency frames, whether or not the high frequency content in that region is valid comprises comparing the high frequency content of the region to the local maximum high frequency content of regions within a neighborhood surrounding the region.

11. The method of claim 10, wherein the high frequency content of a region is considered invalid if (i) it is not sufficiently close to the local maximum high frequency content within the neighborhood surrounding the region or (ii) it is below a predetermined validity threshold.

12. The method of claim 11, wherein the neighborhood surrounding the region comprises regions within the frame and within adjacent frames of the region.

13. The method of claim 2, further comprising generating a validity mask associated with each high frequency frame, each validity mask having a plurality of regions corresponding to respective regions in associated high frequency frame, wherein, for each region in the validity mask, the region comprises a one if the high frequency content in the corresponding region in the associated high frequency frame is valid, and a zero if the high frequency content in the corresponding region in the associated high frequency frame is invalid.

14. The method of claim 1, wherein each region corresponds to a single pixel in each of the plurality of images.

15. The method of claim 1, further comprising acquiring the plurality of images.

16. The method of claim 15, wherein acquiring the plurality of images comprises capturing the plurality of images using an imaging device and adjusting a focus distance of the imaging device.

17. The method of claim 15, wherein acquiring the plurality of images comprises receiving the plurality of images stored in a memory.

18. A thermal imaging camera comprising
a focal plane array having a plurality of infrared detector elements configured to generate infrared images comprising infrared image data based on receive infrared radiation, the generated infrared images including a plurality of regions, each region including image data;
an infrared lens assembly movable relative to the focal plane array;
a motor configured to adjust the position of the infrared lens assembly relative to the focal plane array; and
a processor programmed with instructions to:
capture a plurality of infrared images while moving the infrared lens assembly via the motor such that the infrared images in the plurality infrared images have different focus distances;
perform a validity analysis procedure to determine, for each of a plurality of regions in each of the plurality of infrared images, which regions include valid high frequency content not due to artifacts by comparing the amount of high frequency content in a given region to the amount of high frequency content in nearby regions and/or to a high frequency content validity threshold;
determine, for each of the plurality of regions, which of the plurality of images includes the greatest valid high frequency content; and
generate a final image comprising, in each region, image data from the corresponding region of the image having the greatest valid high frequency content in that region.

19. The thermal imaging camera of claim 18, wherein each of the captured infrared images is indexed according to focus distance and includes focus distance information associated therewith indicative of the position of the infrared lens assembly relative to the focal plane array when the image was captured.

20. The thermal imaging camera of claim 18, wherein each of the plurality of infrared images has a unique index, and the processor is further programmed with instructions to, for each of the plurality of infrared images, generate a corresponding high frequency frame, each high frequency frame having a plurality of regions representative of the high frequency content of the respective region in the corresponding infrared image and having a like index as the corresponding infrared image.

21. The thermal imaging camera of claim 20, wherein the processor is further programmed with instructions to, after capturing the plurality of infrared images, register the plurality of infrared images.

22. The thermal imaging camera of claim 21, wherein the processor is further programmed with instructions to
determine which of the high frequency frames includes the greatest valid high frequency content and designating the corresponding infrared image as the reference frame; and wherein
registering the plurality of infrared images comprises registering the plurality of infrared images to the reference frame.

23. The thermal imaging camera of claim 21, wherein performing the validity analysis procedure comprises, for each region in each high frequency frame, designating a neighborhood of regions surrounding the region, determining a local maximum high frequency within the neighborhood, comparing the high frequency content of the region to the local maximum high frequency content, and, if the high frequency content of the region is not sufficiently close to the local maximum high frequency content, considering the high frequency content in the region to be invalid.

24. The thermal imaging camera of claim 23, wherein the neighborhood of regions associated with a given region in a high frequency frame comprises regions within a predetermined range of the region within the high frequency frame of the region and such regions within each high frequency frame having an index within a predetermined number of indices of the high frequency frame of the region.

25. A non-transitory computer-readable medium comprising instructions for causing a programmable processor to perform a method for generating an image, the method comprising:
   accessing a plurality of images of a target scene, each image having a different focus distance and a unique image index;
   identifying a plurality of regions within each image, wherein each region is defined in each of the plurality of images and includes image data representative of substantially the same portion of the target scene in each image;
   generating, for each of the plurality of images, a high frequency frame, each high frequency frame having a corresponding frame index and a corresponding plurality of regions, and wherein each region of each high frequency frame represents the high frequency content of the region in the corresponding image;
   determining which of regions in each of the high frequency frames includes valid high frequency content not due to artifacts by comparing the amount of high frequency content in a given region to the amount of high frequency content in nearby regions and/or to a high frequency content validity threshold;
   determining, for each region, the frame index of the high frequency frames has the greatest valid high frequency content in that region;
   generating a final image having a corresponding plurality of regions, wherein the final image comprises, for each region, image data from the images having corresponding unique image index as the frame index of the high frequency frame having the greatest valid high frequency content in that region.

26. The non-transitory computer-readable medium of claim 25, further comprising instructions for causing a programmable processor to adjust the focus distance of an imaging device and to capture the plurality of images using the imaging device, and wherein the plurality of accessed images are indexed according to focus distance.

* * * * *